United States Patent Office 2,829,670
Patented Apr. 8, 1958

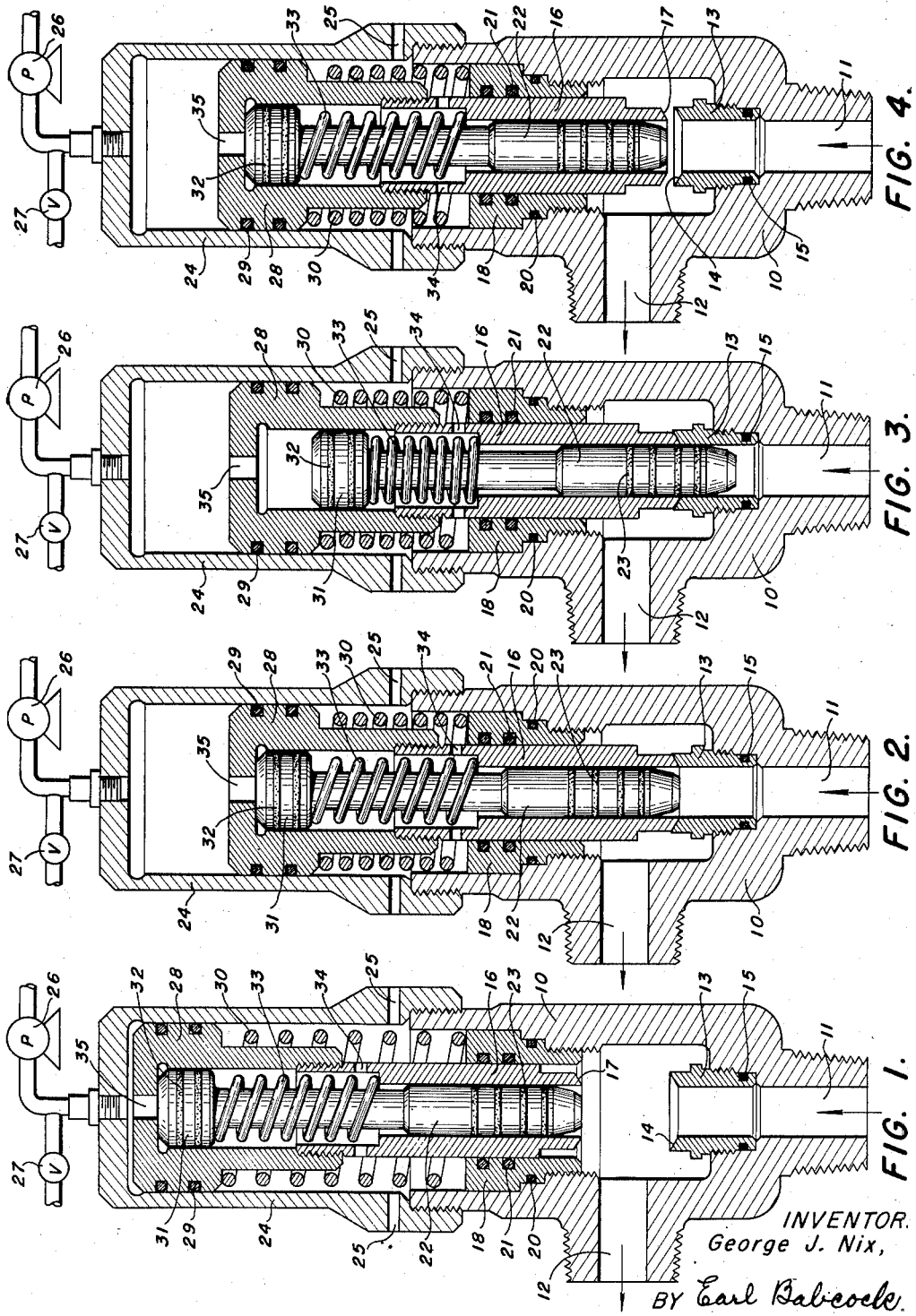

2,829,670
REMOTE CONTROL VALVE ASSEMBLY

George J. Nix, Morgan City, La., assignor to Halliburton Oil Well Cementing Company, Duncan, Okla.

Application June 1, 1954, Serial No. 433,646

7 Claims. (Cl. 137—628)

This invention relates to remote control valves and more particularly to a valve assembly suitable for automatic operation to effect a double seal when closed.

The invention is designed primarily for use in connection with the flow of abrasive material such as cement slurry, mud containing sand or the like, but it will also find application elsewhere.

Remote control valve systems are well known. In such systems, a diaphragm or piston is commonly mounted in a cylinder subjected to fluid pressure and so connected to a valve body as to actuate it. Usually the pressure of the control fluid is employed to move the valve body only in one direction while a spring is employed to move it in the other direction.

The assembly of the present invention is particularly constructed to solve certain problems which arise in the operation of remote control systems. Where fluids are flowing through a valve, there is a tendency for the seat to cut out. The result is that the life of the valve is short. Also, it is common to find a situation where the pressure of the fluid entering the valve is very high and under such circumstances difficulties arise in operating known remote control systems. The present valve assembly is adapted to close effectively and tightly against high pressures.

In accordance with the present invention, a main valve body of a more or less conventional design and having a ring seat, is provided for effecting a rough or partial seal to reduce or nearly stop the flow of fluid. Within this main valve body, a sleeve valve is provided and adapted for independent movement to effect a positive seal across the ring seal of the main valve under certain conditions of operation. The two valves are actuated by pistons or diaphragms in such a way as to cause a certain sequence in their relative movements. This protects the sleeve valve from abrasive action of the fluid.

Accordingly, it is an object of the invention to provide a remote control valve assembly which closes tightly but in which the parts which effect the final seal are not subjected to much wear and tear.

Other objects will be apparent from the following description taken in connection with the accompanying drawings in which Figure 1 is a view in vertical cross-section of an assembly constructed in accordance with the invention and showing the valves thereof in open position;

Figure 2 is a view similar to Figure 1, but showing the main valve closed so that only a limited amount of fluid can flow through the assembly;

Figure 3 is a view similar to Figure 1 but showing the main valve and the sleeve valve both closed so that no fluid can flow through the assembly;

Figure 4 is a view similar to Figure 1 but showing the position of the valves just as they start to open after having been closed.

Referring to the drawing in detail, it will be seen that the assembly there illustrated includes a valve housing 10 provided with an inlet 11 and an outlet 12.

Adjacent the inlet, or really forming part of the inlet is a threaded hollow ring or insert 13. The upper edge of this insert is chamfered to provide a tapered seat 14 for the main valve. This seat 14 will be subjected to considerable wear, especially if abrasive material is flowing through the housing 10 but it will be seen that it can readily be replaced by merely unscrewing it from the housing. An "O-ring" 15 may be used to seal the insert 13 in the housing.

The main valve body seats in the opposite direction to the flow through the housing 10. That is, it moves toward the inlet 11 to close. The body which engages the seat 14 consists of a hollow cylinder 16. It will be seen that the bore of the cylinder 16 is the same as that of the insert 13. The lower edge of this cylinder is beveled as shown at 17 to correspond to the angle of the taper on the seat 14 and provide complementary surfaces. These surfaces are preferably highly resistant to abrasion.

Even though the edge 17 of the main valve body and the seat 14 are made of wear resistant material and are carefully fitted, during use they become worn and leak a certain amount of fluid. In accordance with the present invention, they are not relied upon to effect a complete seal. On the other hand, the design is such that the insert 13 and cylinder 16 can readily be replaced, thus effecting a saving in the use of the assembly.

The cylinder 16 is mounted for sliding movement into or out of engagement with the insert 13. To this end a bushing 18 is threaded into the top or open part of the housing 10. The bushing may be provided with an "O-ring" 20 to seal it to the housing 10 and with a pair of "O-rings" 21 to effect a seal between it and the cylinder 16.

Within the cylinder 16, a solid piston 22 is mounted for reciprocative movement. This piston serves as a sleeve valve when it is extended outwardly of the cylinder 16 into the insert 13 as shown in Figure 3. In this position it covers and seals the seat 14 no matter how much that seat or the edge 17 of the cylinder 16 may be worn away. To prevent the flow of fluid between the piston 22 and the cylinder 16 or the insert 13, depending upon its position, a number of "O-rings" 23 may be provided.

Movement of both the cylinder 16 and the piston 22 is controlled by mechanism illustrated in the upper parts of the figures of the drawing. In accordance with known arragements, diaphragms may be used for controlling the movement of the valve bodies but inasmuch as these are the equivalent of piston they have not been illustrated.

In the arrangement shown, a cap 24 is secured to the top or open end of the housing 10. The lower part of this cap is open to the atmosphere, being provided with one or more ports such as those shown at 25. The upper part of the cap 24 serves as a control chamber. It may be connected to a source of control fluid under pressure, such as that provided by a pump diagrammatically illustrated at 26. A bleed off valve 27, also shown diagrammatically, may be employed to release the fluid pressure in the upper part of the cap 24.

The pump 26 and valve 27 may be located remotely from the valve assembly 10—24.

The bore of the cap 24 is greater than the outside diameter of the cylinder 16. Hence the hollow piston member 28, which is mounted for reciprocative movement in the cap 24 has an outside diameter greater than the diameter of the bore of the bushing 18.

The member 28 may have "O-rings" 29 to effect a seal with the bore of the cap 24.

The member 28 is connected to the cylinder 16, as by screw threads, so that these two parts move together as a unit. A compression spring 30, seated on the bushing 18, urges the member 28 and the cylinder 16 upwardly. If desired, fluid under pressure may be placed in the lower part of the cap 28, as by connecting air under pressure to the ports 25, to exert an upward pressure on the member 28 instead of the spring 30.

The member 28 serves not only as a piston within the cap 24 but also as the cylinder for a smaller piston 31 mounted within it and directly connected to the piston 22 in the cylinder 16. The diameter of the piston 31 is less than the bore of the bushing 18 but greater than the bore of the cylinder 16.

As elsewhere, the piston 31 may be provided with "O-rings" 32 to maintain a seal within the bore of the member 28.

A compression spring 33 may be seated upon a shoulder on the inside of the cylinder 16 and urge the piston 31 and hence the piston 22 upwardly.

The cylinder 16 is provided with ports 34 so as to connect the bore of the member 28 below the piston 31 to the atmosphere through the ports 25 in the cap 24. If the lower part of the cap 24 is maintained under pressure, as mentioned above, it will be unnecessary to have either the spring 33 or the spring 30.

The top part of the member 28 is provided with a passageway 35 to maintain practically the same pressure within its bore above the piston 31 as that which prevails in the upper part of the cap 24.

The drawings and the above description set forth the best mode contemplated for applying the principles of the invention. However, in its elementary form it is not necessary to build the parts exactly as illustrated and described. It is within the purview of the invention to make the piston 31 of the same diameter as the piston 22 and eliminate the spring 33 and the port 34, so that the sleeve valve and piston 31 is merely a rod of uniform diameter and the bore of the member 28 of the same diameter as the bore of the cylinder 16. The reason the piston 31 is shown and described as having a larger diameter than the piston 22 is because this makes possible the use of a somewhat lower control pressure in the upper part of the cap 24.

It is also possible to operate the assembly without the spring 30 being employed. This spring is desirable, as is the spring 33, to hold the parts in the position shown in Figure 1 even though there is no pressure in the housing 10. If these springs are absent, and the assembly is connected in a flow line, the pressure in the housing 10 will cause the parts to take the position shown in Figure 1 if there is no pressure in the upper part of the cap 24. The operation is the same whether or not the springs 30 and 33 are used.

In considering the operation of the assembly illustrated, let it be assumed that the parts are in the position shown in Figure 1 so that fluid is flowing freely from the inlet 11 to the outlet 12. There is now no pressure in the upper part of the cap 24. If now the bleed valve 27 is closed and the control pump 26 actuated, pressure in the upper part of the cap will rise. When the pressure on the area of the member 28 is high enough to overcome the force of the spring 30 (if it is used) plus the fluid pressure exerted in the housing 10 on the area of the cylinder 16, the member 28 will move down, seating the cylinder 16 on the insert 13. The piston 22 will not move relative to the cylinder 16 at this time, so that the parts will take the position shown in Figure 2. In this position, only a slight amount of fluid is flowing through the rough seal at 14—17.

However, upon the pressure in the upper part of the cap continuing to increase under the influence of the control pump 26, the force of the spring 33 (if it is used) plus the fluid pressure in the housing 10 exerted upwardly on the piston 22 will be overcome by the pressure on the piston 31, so that the pistons 31 and 22 will move on down and the parts will take the position shown in Figure 3. In this position all flow of fluid through the assembly is stopped.

The sealing action when the parts are in the position of Figure 3 is twofold. The pressure exerted downwardly on the cylinder 16 is much greater now than was the case when the parts were in the position of Figure 2, and it is greater on the seal at 14—17 than the force holding the piston 22 down in the insert 13. This is true because of the large area of the member 28 across the outer part of which there is a difference in pressure between that in the upper part of the cap 24 and the atmospheric pressure in the lower part of the cap 24. This high downward force resulting from this differential area is exerted on the cylinder 16 and diminishes the tendency for fluid to leak through the seal at 14—17. At the same time, the piston 22 has effectively covered the seal at 14—17. The arrangement is such that if the pump 26 is now stopped and the pressure in the chamber in the top of the cap maintained, a sudden increase or surge in the fluid inlet 11 will not tend to cause the main valve 14—17 to leak, as it does in other arrangements where a valve body is seated in opposition to the pressure of a flow line. In the present case, when an increase in pressure occurs in the inlet 11, that pressure is exerted primarily on the piston 22 which is now fully floating and free to move upwardly to some extent without causing its lower "O-ring" 23 to rise above the seal 14—17. The pistons 22—31 move and actually permit the pressure in the top of the cap 24 to increase the differential pressure exerted on the outer part of the member 28, so that the downward force exerted upon the member 28 and hence upon the cylinder 16 is even greater than before.

With the parts in the position shown in Figure 3, let it now be assumed that flow through the housing 10 is to be resumed. The bleed valve 27 is opened and the pressure in the top of the cap 24 reduced. The first thing that happens under these circumstances is the retraction of the piston 22 back up into the cylinder 16. This occurs before the cylinder 16 raises off of its seat because of the pressure exerted on the piston 22 by the fluid in the insert 13. The piston 22 is thus drawn up into the cylinder 16 and the "O-rings" 23 thereon protected before the fluid again flows through the housing 10.

The essential characteristic of the invention is the provision of the differential pressure action on the member 28 working in the cap 24. Whether or not the lower part of the cap 24 is exposed to the atmosphere through the ports 25, it is contemplated that the pressure therein will be considerably less than that in the inlet 11. Thus, when the pressure in the upper part of the cap 24 is raised, the outer portion of the member 28 will be subjected to a greater pressure difference than the inner portion. The outer portion consists of the area of a circle defined by the inside diameter of the cap 24 less the area of a circle defined by the inside diameter of the bushing 18. The inner portion of the member 28 consists of the area of the circle defined by the inside diameter of the bushing 18. The plunger 22—31 does not modify this pressure subject area.

If the piston 31 is the same diameter as the piston 22 and the ports 34 deleted, the plunger 22—31 will not be subjected to any differential action. If these parts are built as illustrated, the piston 31 will have an outer area subjected to differential action similar to that of the outer area of the member 28.

Only one embodiment of the invention has been shown and described herein and it is obvious that various changes might be made. If the arrangement is used to pump cement slurry, the housing 10 should probably be more streamlined than that illustrated to reduce the tendency for the cement to set up therein and clog the passageways. Various other changes can be made without departing from the spirit of the invention or the scope of the annexed claims.

I claim:

1. A remote control valve assembly for effecting a double seal automatically when closed comprising a housing, an inlet and an outlet for conveying fluid under pressure through the housing, a valve seat adjacent the inlet, a main valve body adapted to move toward the inlet to engage the seat and close against the pressure of the fluid in the inlet, a piston mounted for sliding movement in the main valve body and adapted to extend outwardly thereof and into the inlet, when the main valve is closed, to cover and seal the seat, a control chamber for actuating said main valve body and said piston, means associated with the control chamber for developing or relieving a fluid control pressure therein, a movable member mounted in said control chamber, means for subjecting one side of said member to the fluid control pressure, means for subjecting a part of the other side of said member to atmospheric pressure and means for subjecting another part of the other side of said member to the pressure of the fluid in said inlet whereby differential pressure action is obtained on said member, means connecting said member to the main valve body to cause the main valve body to move in accordance with the differential pressure action, and means for subjecting said piston to the fluid control pressure to cause it to move.

2. A remote control valve assembly for effecting a double seal automatically when closed, comprising a housing, an inlet and an outlet for conveying fluid under pressure through the housing, a valve seat adjacent the inlet, a main valve body adapted to move toward the inlet to engage the seat and close against the pressure of the fluid in the inlet, a piston mounted for sliding movement within the main valve body and adapted to extend outwardly thereof and into the inlet, when the main valve is closed, to cover and seal the seat, a control chamber for actuating said main valve body and said piston, means associated with the control chamber for developing or relieving a fluid control pressure therein, a movable member mounted in said control chamber, means for subjecting one side of said member to the fluid control pressure, means for subjecting a portion of the other side of said member to the pressure of the fluid in said inlet of the housing and means for subjecting another portion of the other side of said member to a pressure lower than that prevailing in said inlet whereby differential pressure action is obtained on said member, means connecting said member to said main valve body to cause the main valve body to move in accordance with the differential pressure action and means for subjecting said piston to the fluid control pressure to cause it to move.

3. A remote control valve assembly as defined in claim 1 in which said inlet and said main valve body have tapered complementary seating faces and are made of material highly resistant to abrasion.

4. A remote control valve assembly as defined in claim 1 in which said inlet and said main valve body have tapered complementary seating faces and in which the inlet includes an insert which may readily be replaced.

5. A remote control valve assembly as defined in claim 1 in which means is provided for subjecting said piston to differential pressure action similar to that controlling movement of said member.

6. A remote control valve assembly as defined in claim 1 in which a spring is provided for urging said main valve body out of engagement with the seat in said inlet.

7. A remote control valve assembly as defined in claim 1 in which springs are provided for urging said main valve body and said piston out of engagement with said inlet.

References Cited in the file of this patent

UNITED STATES PATENTS

| | | |
|---|---|---|
| 816,474 | Johnson | Mar. 27, 1906 |
| 2,561,214 | Matson | July 17, 1951 |
| 2,656,851 | Nichols | Oct. 27, 1953 |
| 2,756,772 | Clark | July 31, 1956 |

FOREIGN PATENTS

| | | |
|---|---|---|
| 708,635 | Great Britain | May 5, 1954 |